US010398192B2

(12) United States Patent
Hunter

(10) Patent No.: US 10,398,192 B2
(45) Date of Patent: Sep. 3, 2019

(54) BICYCLE PEDAL SYSTEM

(76) Inventor: Samuel R. Hunter, Ogden, UT (US)

( * ) Notice: Subject to any disclaimer, the term of this patent is extended or adjusted under 35 U.S.C. 154(b) by 6 days.

(21) Appl. No.: 12/784,844

(22) Filed: May 21, 2010

(65) Prior Publication Data

US 2011/0283565 A1 Nov. 24, 2011

(51) Int. Cl.
*B62M 3/08* (2006.01)
*A43B 5/14* (2006.01)

(52) U.S. Cl.
CPC ............... *A43B 5/14* (2013.01); *B62M 3/086* (2013.01); *Y10T 74/217* (2015.01)

(58) Field of Classification Search
CPC ............ B62M 3/08; B62M 3/086; A43B 5/14
USPC ........................ 74/594.4, 594.6, 560; 36/131
See application file for complete search history.

(56) References Cited

U.S. PATENT DOCUMENTS

| | | | | |
|---|---|---|---|---|
| 4,665,767 | A | 5/1987 | Lassche | |
| 4,803,894 | A * | 2/1989 | Howell | 74/594.6 |
| 4,942,778 | A * | 7/1990 | Bryne | 74/594.6 |
| 5,377,561 | A | 1/1995 | Danieli et al. | |
| 6,324,941 | B1 * | 12/2001 | Ho | 74/594.6 |
| 7,204,789 | B1 * | 4/2007 | Wang | 482/57 |
| 2006/0090590 | A1 * | 5/2006 | Malle | 74/594.6 |

FOREIGN PATENT DOCUMENTS

| | | | | |
|---|---|---|---|---|
| EP | 1972221 A2 * | 9/2008 | | A43B 5/14 |
| JP | 59-063283 | 4/1984 | | |
| JP | 59-075883 | 4/1984 | | |
| WO | WO 2006/097461 * | 9/2006 | | B62M 3/08 |

OTHER PUBLICATIONS

Machine Translation of WO 2006/097461, obtained Jun. 3, 2016.*
ISA/KR, International Search Report and Written Opinion in PCT/US2011/036111, dated Nov. 2, 2011, 9 pages.

* cited by examiner

*Primary Examiner* — Richard W Ridley
*Assistant Examiner* — Brian J McGovern
(74) *Attorney, Agent, or Firm* — Jeff Holman

(57) ABSTRACT

Implementations of the present invention comprise devices, systems, components, and methods for use with bicycle pedals. For example, implementations of the invention provide a bicycle pedal system that efficiently and easily allows a cyclist to securely engage an engagement assembly located on the spindle with a cleat. In particular, implementations of the present invention provide an engagement assembly with a first and a second grabber. The first grabber and second grabber are easily guided to come into contact with protrusions located on the cleat such that the engagement assembly securely engages the cleat, thus allowing a cyclist to take advantage of both down-strokes and up-strokes, while at the same time providing an easy and efficient way for the cyclist to engage the pedals.

20 Claims, 11 Drawing Sheets

BICYCLE PEDAL SYSTEM

BACKGROUND OF THE INVENTION

1. The Field of the Invention

The present disclosure is generally related to bicycle pedals. In particular, the present disclosure is generally related to bicycle pedals and cleat systems for high performance bicycles.

2. Background and Relevant Art

A bicycle pedal is the part of a bicycle that the rider pushes with his or her foot to propel the bicycle. In other words, the pedal provides the connection between the cyclist's foot (or shoe) and the crank arm, which allows the cyclist's leg to turn the drive assembly on the bicycle. Conventional pedals may include a spindle that threads into the end of the crank, and an engagement body on which the foot rests. The engagement body is usually free to rotate with respect to the spindle. There are several variations and styles of pedals, including: flat and platform pedals, strap pedals, and clip-in pedals.

Traditionally, flat or platform pedals may be relatively large and have a flat area on which the foot rests. Although there are bicycle applications that use flat or platform pedals, for many cycling applications, especially high performance racing, flat or platform pedals may have several disadvantages. For example, platform pedals only allow a cyclist to harness power on the down-stroke, while it is not possible for the cyclist to harness any power on the up-stroke because the cyclist's foot is not attached in any way to the platform pedal. Moreover, flat or platform pedals usually have a large engagement body that may weigh much more than other types of pedals, thus increasing the overall weight of the bicycle, which may affect the performance of the bicycle.

In addition to flat or platform pedals, another style of pedal is known as strap pedals. Strap pedals are pedals that include a toe strap, and in some cases, a heel strap that straps around a cyclists shoe. Although the strap may allow a cyclist to harness some power on the up-stroke due to the fact that the strap(s) give the cyclist the ability to pull on the pedal during the up-stroke, there are several disadvantages with strap pedals. In particular, strap pedals can often cause injury if a cyclist crashes while riding because the straps may not allow the cyclist's foot to come free of the pedal in the event of a crash. Thus, the cyclist's ankle or legs may twist causing additional injury. Moreover, strap pedals are often cumbersome to adjust and put on, causing the cyclist to waste time when trying to adjust the straps around his or her shoe.

In order to avoid the disadvantages of the strap pedal, a cyclist may attempt to use what are known as clip-in or step-in pedals. Traditional clip-in pedals generally employ a special cycling shoe with a cleat fitted to the sole. The cleat may be configured to lock into a mechanism on the pedal, thus holding the shoe firmly to the pedal. Many conventional clip-in pedals lock to the cleats when stepped together firmly by the cyclist. Traditional clip-in pedals have several disadvantages. For example, some models of clip-in pedals require a user to manually move a lever in order to release the cleat from the pedal, thus possibly resulting in a low speed crash as the cyclist attempts to release the cleat from the pedal.

In addition to problems when trying to release the cleat from the pedal, many models of clip-in pedals also may require the cyclist to precisely place the cleat into a particular location in the pedal in order for the cleat to engage the pedal properly. Due to the difficulty in finding the precise location of the pedal, a cyclist may crash while attempting to engage the cleat to the pedal.

Moreover, conventional clip-in pedals can incorporate several parts, which make the clip-in pedals heavier and more expensive to produce and use. Moreover, the reliability of the clip in pedal may suffer due to the amount of moving parts, especially in cycling application where the pedals may become muddy, such as dirt bike racing our mountain biking. For any one of the above mentioned reasons, many cyclists simply do not attempt to use clip-in pedals, and opt for a flat or platform pedals and their associated disadvantages.

Thus, there are several disadvantages in the art of bicycle pedals that can be addressed.

BRIEF SUMMARY OF THE INVENTION

Implementations of the present invention comprise devices, systems, components, and methods for use with bicycle pedals. For example, implementations of the invention provide a bicycle pedal system that efficiently and easily allows a cyclist to securely engage an engagement assembly located on the spindle with a cleat. In particular, implementations of the present invention provide an engagement assembly with an inside grabber and an outside grabber. The inside grabber and outside grabber are easily guided to come into contact with protrusions located on the cleat such that the engagement assembly securely engages the cleat, thus allowing a cyclist to take advantage of both down-strokes and up-strokes, while at the same time providing an easy and efficient way for the cyclist to engage the pedals.

In one example implementation, a pedal system includes a cleat that is attached to the bottom of a shoe. The cleat includes a frame with a front wall, and a first and second side wall. The cleat further includes a first protrusion that is located on the first side wall and extends towards the second side wall, and a second protrusion that is located on the second side wall and extends toward the first side wall. The pedal system also can include an engagement assembly that has an outside grabber that is immovably coupled to an outside end of a spindle. The engagement assembly can further include an inside grabber that is movably positioned between the outside grabber and a stop that is located on the spindle. In operation, the first protrusion and second protrusion on the cleat engage the outside grabber and inside grabber by overcoming the bias and moving the inside grabber toward the outside grabber until the first protrusion engages an outside recess and the second protrusion engages an inside recess.

In another implementation of the present invention, a cleat for use with a pedal system includes a front wall, a first side wall, and a second side wall. Furthermore, the cleat can include a first protrusion located on the first side wall and extending toward the second side wall. Additionally, the cleat can include a second protrusion located on the second side wall and protruding toward the first side wall.

In yet another implementation of the present invention, an engagement assembly for use with a pedal system includes an outside grabber (e.g., a first grabber) immovably coupled to the outside end (e.g., a second end, a second threaded end, or a threaded end (see FIG. 5A)) of the spindle having an outside engagement recess. The engagement assembly further includes an inside grabber (e.g., a second grabber) movably positioned between the outside grabber and a stop located between the outside end of the spindle and an inside end (e.g., a first end) of the spindle, the inside grabber having an inside engagement recess.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
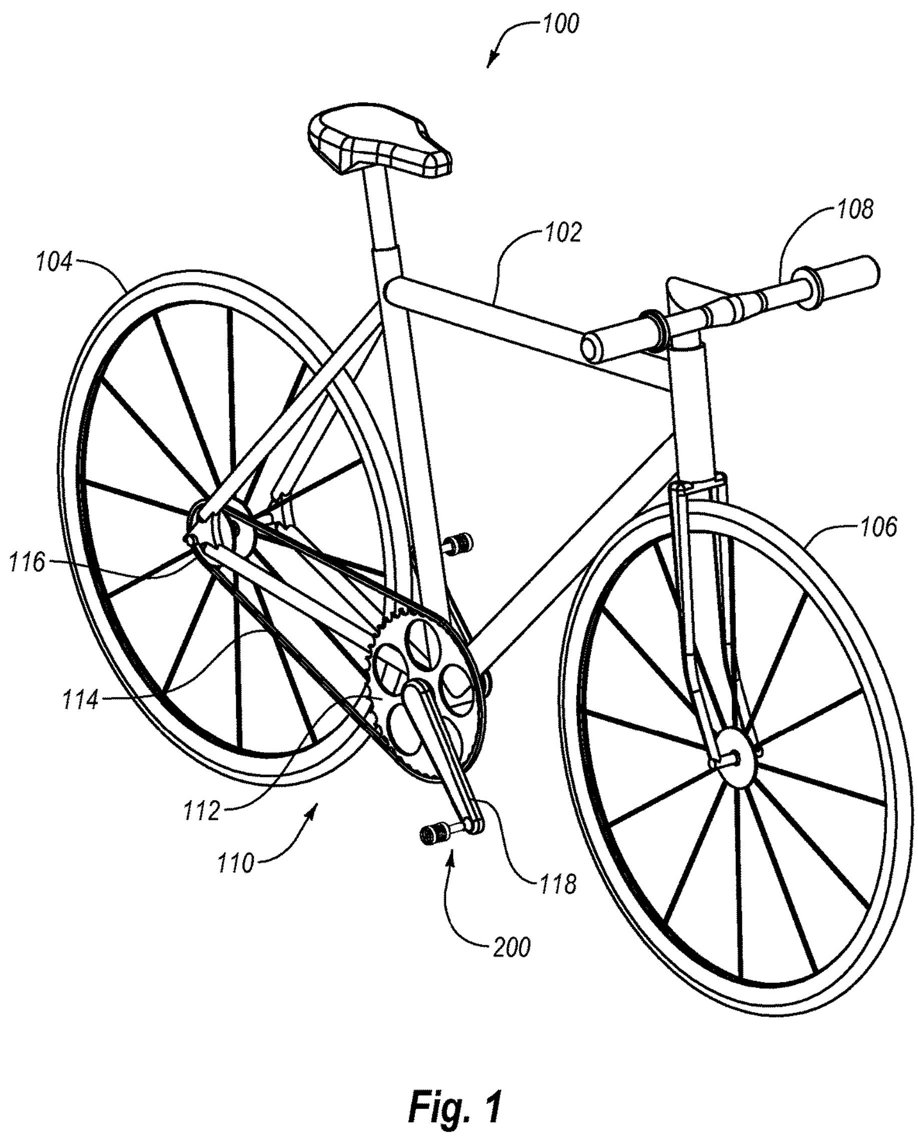
FIG. 1 illustrates a perspective view of a bicycle equipped with a pedal system in accordance with an example implementation of the present invention.

Implementations of the present invention comprise devices, systems, components, and methods for use with bicycle pedals. For example, implementations of the invention provide a bicycle pedal system that efficiently and easily allows a cyclist to securely engage an engagement assembly located on the spindle with a cleat. In particular, implementations of the present invention provide an engagement assembly with an inside grabber and an outside grabber. The inside grabber and outside grabber are easily guided to come into contact with protrusions located on the cleat such that the engagement assembly securely engages the cleat, thus allowing a cyclist to take advantage of both down-strokes and up-strokes, while at the same time providing an easy and efficient way for the cyclist to engage the pedals.

In particular, implementations of the present invention can overcome disadvantages in conventional bicycle pedal systems. For example, unlike flat of platform pedals, the pedal system, according to implementations of the present invention, allow the cyclist to use both a down-stroke and an up-stroke, thus increasing the power that a cyclist can generate while cycling. Moreover, pedal systems according to implementations of the present invention also provide a pedal system that is drastically more light-weight compared to flat or platform pedals. In addition, implementations of the present invention allow the cyclist to securely engage the pedal such that the cyclist's feet (or shoes) do not easily slip off the pedal, as can be the case with flat or platform pedals.

In addition, implementations of the present invention provide a bicycle pedal system that, unlike many strap pedals, allows a cyclist to free their foot or shoe in the event of a crash. Moreover, the pedal system according to implementations of the present invention provide a pedal system that is not cumbersome and difficult to adjust, rather, the pedal system disclosed herein provides a cleat and engagement assembly that easily engage one another in a secure and comfortable manner each time a cyclist engages the pedal system.

Furthermore, implementations of the present invention not only provide a cyclist with not only an efficient and easy engagement of the cleat to the engagement assembly, but also provide a cyclist with an easy and efficient disengagement of the engagement assembly. In particular, the pedal system disclosed herein does not require a cyclist to push or pull any lever or switch in order to disengage the cleat from the engagement assembly. Thus, implementations of the present invention provide a pedal assembly wherein a cyclist greatly reduces the risk of a low speed crash when trying to engage and/or disengage the cleat with the engagement assembly on the pedal system.

In order to provide an efficient and easy engagement and disengagement of the cleat from the engagement assembly, examples of the present invention include configurations that allow a cyclist to easily place the cleat in the proper location with respect to the engagement assembly. Therefore, a cyclist can quickly guide the cleat into engagement with the engagement assembly, which reduces the risk that the cyclist does not engage the pedal and cannot propel the bicycle enough to avoid crashing. Also, unlike many conventional clip-in pedals, the pedal system described herein employs relatively few parts, which reduces the cost and increases the reliability of the pedal system relative to conventional clip-in pedals.

FIG. 1 illustrates one example of a bicycle 100 that can incorporate the pedal system 200. In particular, FIG. 1 illustrates that the bicycle 100 can have a traditional design having a frame 102 that rests upon a rear wheel 104 and a front wheel 106. In addition, handle bars 108 are coupled to the front wheel 106 such that a cyclist can steer the bicycle 100. Although FIG. 1 illustrates the bicycle 100 having a traditional design, a cyclist can use the pedal system 200 with almost any design or type of bicycle. For example, in additional implementations, a cyclist can use the pedal system 200 with street bicycles, racing bicycles, mountain bicycles, hybrid bicycles, and any other style of bicycle.

In addition to the various styles and designs of bicycles with which a cyclist can use pedal system 200, the pedal system 200 can be used on other vehicles that incorporate pedals. For example, a user can incorporate implementations of the pedal system 200 onto modified bicycles, tricycles, pedal boats, exercise bikes, and any other vehicle or device that incorporates pedals in which a user would engage the pedals with their foot or shoe.

In addition to the general design of the bicycle 100, the bicycle 100 can further include a drive assembly 110 having a gear 112 that transfers rotational force from the gear 112 to the cog-set 116 through a chain 114. The drive assembly can further include a crank arm 118 that is coupled to the gear 112 on a first end of the crank arm 118, while the pedal system 200 extends from a second end of the crank arm 118, as illustrated in FIG. 1. In use, a cyclist can engage the pedal system 200 with his or her feet and apply ample force such that the gear 112 rotates, which in turn causes the chain 114 to transfer the rotational force from the gear 112 to the cog-set 116. The cog-set 116 is associated with the rear wheel 104 such that as the chain 114 rotates the cog-set 116, the rear wheel 104 rotates and propels the bicycle 100.

Figure 2:
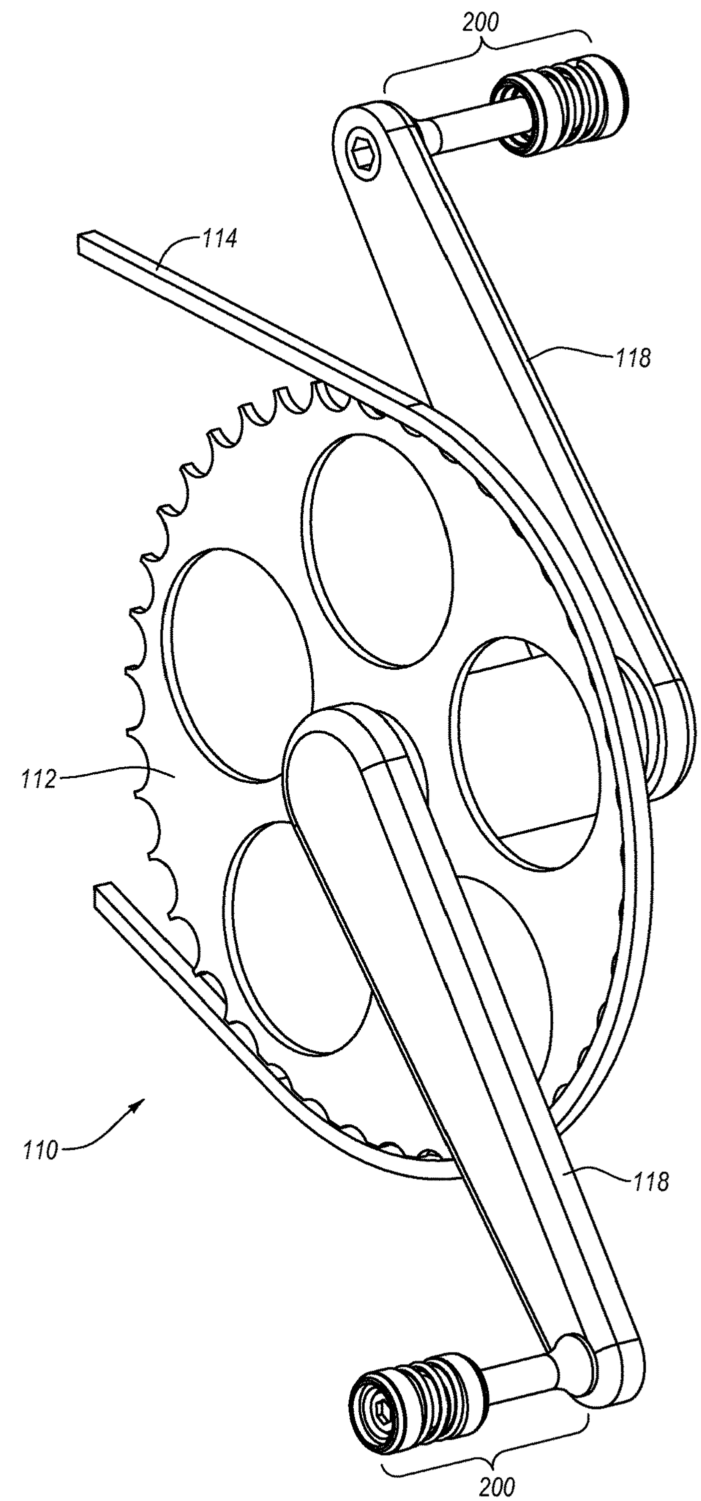
FIG. 2 illustrates a perspective view of the drive assembly with a pedal system in accordance with an implementation of the present invention.

FIG. 2 illustrates a zoomed-in view of the drive assembly 110. In particular, FIG. 2 illustrates that the pedal system 200 can attached to the one end of the crank arm 118 such that a cyclist can rotate the crank arm 118 by applying pressure to the pedal assemblies 200 in a pedaling motion. As the crank arms 118 rotate, the gear 112 also rotates causing the chain 114 to transfer the rotation force from the gear 112 to the chain. Although FIG. 2 illustrates that the crank arms 118 are associated with only the single gear 112, in other implementations the crank arms 118 can be associated with a plurality of gears and a gear changing device such that the chain 114 can be changed from one gear to the next.

Figure 3:
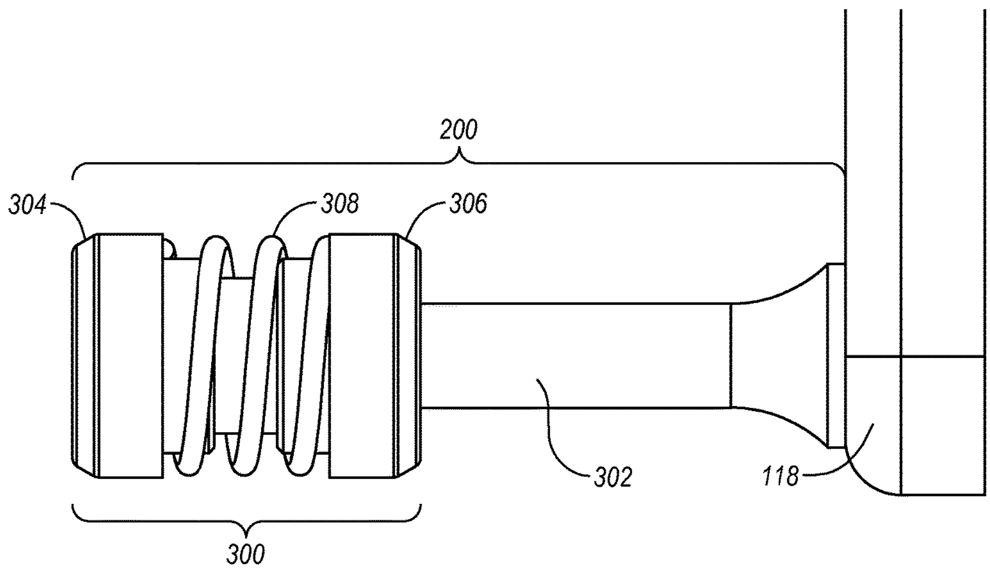
FIG. 3 a plan view of an engagement assembly of the pedal system shown in FIG. 2.

FIG. 3 illustrates a plan view of the pedal system 200. In one example implementation, the pedal system 200 includes an engagement assembly 300 that is coupled to one end of a spindle 302. As illustrated in FIG. 3, the spindle 302 is coupled to the crank arm 118 on the opposite end of the engagement assembly. As can be appreciated, the manner in which the spindle 302 couples to the crank arm 118 can vary from one implementation to the next. For example, in one implementation the spindle 302 can include threads on one end such that the spindle 302 can be threaded into a corresponding hole located on the crank arm 118. In another implementation, the spindle 302 may extend completely through the crank arm 118 such that a bolt, clip, or other fastener can couple to the portion of the spindle 302 that extends past the crank arm 118 and thus couple the spindle 302 securely to the crank arm 118.

In addition to various manners in which the spindle 302 can connect to the crank arm 118, the spindle 302 may also have various geometric configurations. FIG. 2 shows that the spindle 302 can generally have a cylindrical body portion that flares to a larger diameter near the end that couples to the crank arm 118. However, the spindle 302 can have almost any geometric configuration so long as the spindle 302 can support the force from the cyclist during pedaling. For example, in an alternative implementation the spindle 302 may not have the flared portion, or the spindle 302 may have a non-cylindrical shape.

Just as the geometric configuration of the spindle 302 can vary, so too can the dimensions of the spindle 302 vary from one implementation to the next. For example, the length of the spindle 302 (i.e., the dimension of the spindle 302 from the engagement assembly 300 to the crank arm 118) can vary. For instance, the length of the spindle 302 can range between about 1.0 inches to about 2.5 inches. However, the length of the spindle 302 can be larger or smaller depending on the type of cycling application, a cyclist's personal preference, or other similar factors that can affect the length of the spindle 302.

In addition to the length of the spindle 302, the cross-sectional dimension of the spindle 302 can vary from one implementation to the next. For example, the spindle 302 can have a cross-sectional dimension that ranges from about 0.5 inches to about 1.25 inches depending on the configuration of the spindle 302 and/or the overall configuration of the pedal assembly 200. Moreover, the cross-sectional dimension of the spindle 302 may be larger or smaller depending on the application in which the pedal assembly 200 is used.

One characteristic that can affect the cross-section dimension of the spindle 302 is the material in which the spindle 302 is made. In one example implementation, the spindle 302 is made from a light weight metal such as titanium. In alternative implementations, other types of metals or alloys of metals can be used to make the spindle. Furthermore, the spindle 302 material can also be a made from a high-strength plastic, or from composite materials that offer a high strength to weight ratio.

Continuing with the plan view of the pedal assembly 200, FIG. 3 shows that the engagement assembly 300 includes, among other example components, an outside grabber 304 opposing an inside grabber 306 with a spring 308 biasing the inside grabber 306 away from the outside grabber 304. As will be discussed in more detail below, the outside grabber 304 and the inside grabber 306 engage a cleat 400 (see FIG. 4) such that a cyclist can securely engage the pedal assembly 200 while cycling.

As with the spindle 302, the engagement assembly 300 can have various geometric and dimensional characteristics. In one implementation, the engagement assembly 300 has a substantially cylindrical configuration such that a cyclist can engage the engagement assembly 300 with the cleat 400 no matter the orientation of the engagement assembly 300. In other words, because of the substantially cylindrical configuration of the engagement assembly 300, the engagement assembly 300 always presents an identical engagement target to a cyclist, therefore, eliminating the need for a cyclist to orient the engagement assembly 300 in a particular orientation prior to engaging, as is the case with many conventional clip-in pedals.

In addition to the geometric configuration, the dimensions of the engagement assembly 300 can vary from one implementation to the next. For example, the length of the engagement assembly 300 can vary. Example ranges of length are between about 1.0 inches to about 3.5 inches. In alternative implementations, the length of the engagement assembly 300 can be longer or shorter depending on the dimensions of the cleat 400 (see FIG. 4A), as will be discussed in greater detail below.

Furthermore, the cross-sectional dimension of the engagement assembly 300 can vary from one implementation to the next. In particular, implementations of the engagement assembly 300 can have a cross-sectional dimension of about 0.5 inches to about 2.0 inches depending again on the application in which the pedal system 200 is used, and/or the preference of a particular cyclist. As is appreciated, the cross-sectional dimension of the engagement assembly 300 can be larger or smaller depending on the particular configuration of the pedal system 200.

Figure 4A:
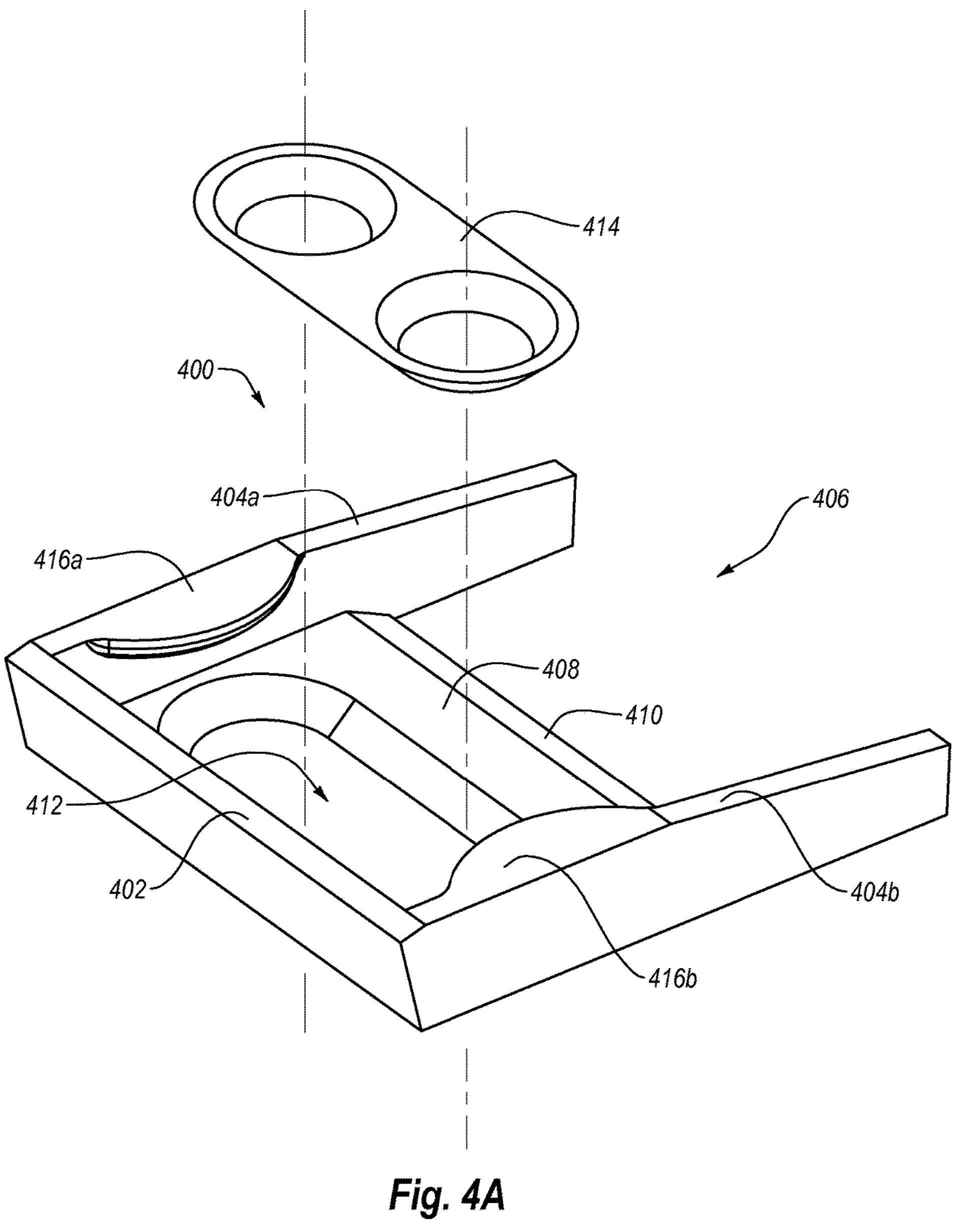
FIG. 4A illustrates an orthogonal view of an example cleat portion of a pedal assembly in accordance with the present invention.

As mentioned above, the engagement assembly 300 can interface with the cleat 400 in order for a cyclist to securely engage the pedal assembly 200 while cycling. In particular, FIG. 4A illustrates that the cleat 400 can have a u-shaped configuration with a front wall 402 in combination with side walls 404*a* and 404*b* (each having inner and outer surfaces) that create an open back 406. Although FIG. 4A illustrates the cleat 400 with a u-shaped configuration, the cleat 400 can form various other configurations. For example, in an alternative implementation, the cleat 400 can form a v-shaped configuration with the two side walls 404*a* and 404*b* angling off the front wall 402 at an angle greater than ninety degrees with respect to the front wall 402.

In addition to the overall configuration of the cleat 400, FIG. 4A illustrates that the front wall 402 and the side walls 404*a* and 404*b* can have substantially the same length. However, in alternative implementations, the side walls 404*a* and 404*b* can have substantially different lengths (e.g., either longer or shorter) compared to the front wall 402. For example, in one implementation, the side walls 404*a* and 404*b* are significantly shorter than as illustrated in FIG. 4A such that the cleat 400 footprint becomes much smaller. Smaller side walls 404*a* and 404*b* can be used for more experienced cyclists that have more practice in using the pedals system 200, while less experienced cyclists can use longer side walls 404*a* and 404*b* such that the side walls 404*a* and 404*b* can more effectively direct the engagement assembly 300 into the cleat 400.

As FIG. 4A illustrates, the front wall 402 and the side walls 404*a* and 404*b* can surround a base 408. The base 408 can include an inclined edge 410. The inclined edge 410 can be inclined at an angle such that the engagement assembly 300 can easily be directed over the base 408 such that the engagement assembly 300 engages with the cleat 400. In addition to the inclined edge 410, the base 408 can also include a bolt plate interface 412 that cooperates with a bolt plate 414 such that the cleat 404 can be attached to a shoe.

As illustrated in FIG. 4A, the bolt plate interface 412 corresponds to the bolt plate 414 such that the bolt plate 414 can securely hold the cleat 400 to a shoe. The bolt plate 414 and the bolt plate interface 412 can have a stadium-shaped configuration with the bolt plate interface 412 having an angled perimeter that matches a corresponding angled perimeter of the bolt plate 414. In alternative implementation, the bolt plate 414 and the bolt plate interface 412 can have various other geometric configurations so long as the bolt plate interface 412 interfaces with the bolt plate 414 such that the bolt plate 414 is able to secure the cleat 400 to a shoe.

In one example implementation, the bolt plate 414 has a shorter length than the bolt plate interface 412. In this implementation, a cyclist can adjust the position of the cleat 400 on the shoe by moving the cleat side-to-side on the shoe before completely tightening the bolt plate 414 to the shoe. In yet another implementation, the bolt plate 414 can have a substantially circular geometric configuration which can allow a cyclist to not only adjust the cleat 400 from side-to-side, but also allow a cyclist to rotate the cleat 400 on the shoe at a desired angle that is customized for the particular cyclist.

The geometric configuration of the bolt plate 414 can also affect other characteristics of the bolt plate 414. For example, FIG. 4A illustrates the bolt plate as having two fastener ports whereby fasteners can extend through the bolt plate 414 and into a shoe. In a different example implementation, the bolt plate can have more or fewer fastener ports. For example, in one implementation, a single fastener port is located in the bolt plate 414. In other implementations, the bolt plate 414 can have several fastener ports. Additionally, the angled perimeter surfaces of both the bolt plate 414 and the bolt plate interface 412 can have ridges or another mating texture such that the bolt plate 414 securely grips the cleat 404 upon the bolt plate 414 mounting securely to a shoe.

FIG. 4A also illustrates that the cleat 400 can include protrusions 416*a* and 416*b* that extend from the side walls 404*a* and 404*b*, respectively. As FIGS. 4A shows, the protrusions 416*a* and 416*b* protrude toward one another and are located on opposing positions on side walls 404*a* and 404*b*. The protrusions 416*a* and 416*b* are one example of how the cleat 400 can engage the engagement assembly 300. Although FIG. 4A illustrates that the protrusions 416*a* and 416*b* have a semi-circular configuration, the protrusions can be almost any configuration that can engage the engagement assembly 300. For example, in an alternative implementation, the protrusions 416*a* and 416*b* can be rectangular, triangular, or any other shape that will engage with the engagement assembly 300.

Just as the configurations and features of the cleat 400 can vary from one implementation to the next, the material with which the cleat 400 is made can also vary. In one implementation, the cleat 400 material can be 304 or 17-4 stainless steel. Other grades of stainless steel may also be used. In another example implementation, the cleat 400 material can be carbon fiber or another similar material. Moreover, the cleat 400 material can include other metals, alloys of metals, or any other rigid material that would securely engage the engagement assembly 300. Furthermore, the cleat 400 can be made from a variety of materials (i.e., the base 408 material could vary from the front wall 402 and side wall 404*a* and 404*b* material.

Figure 4B:
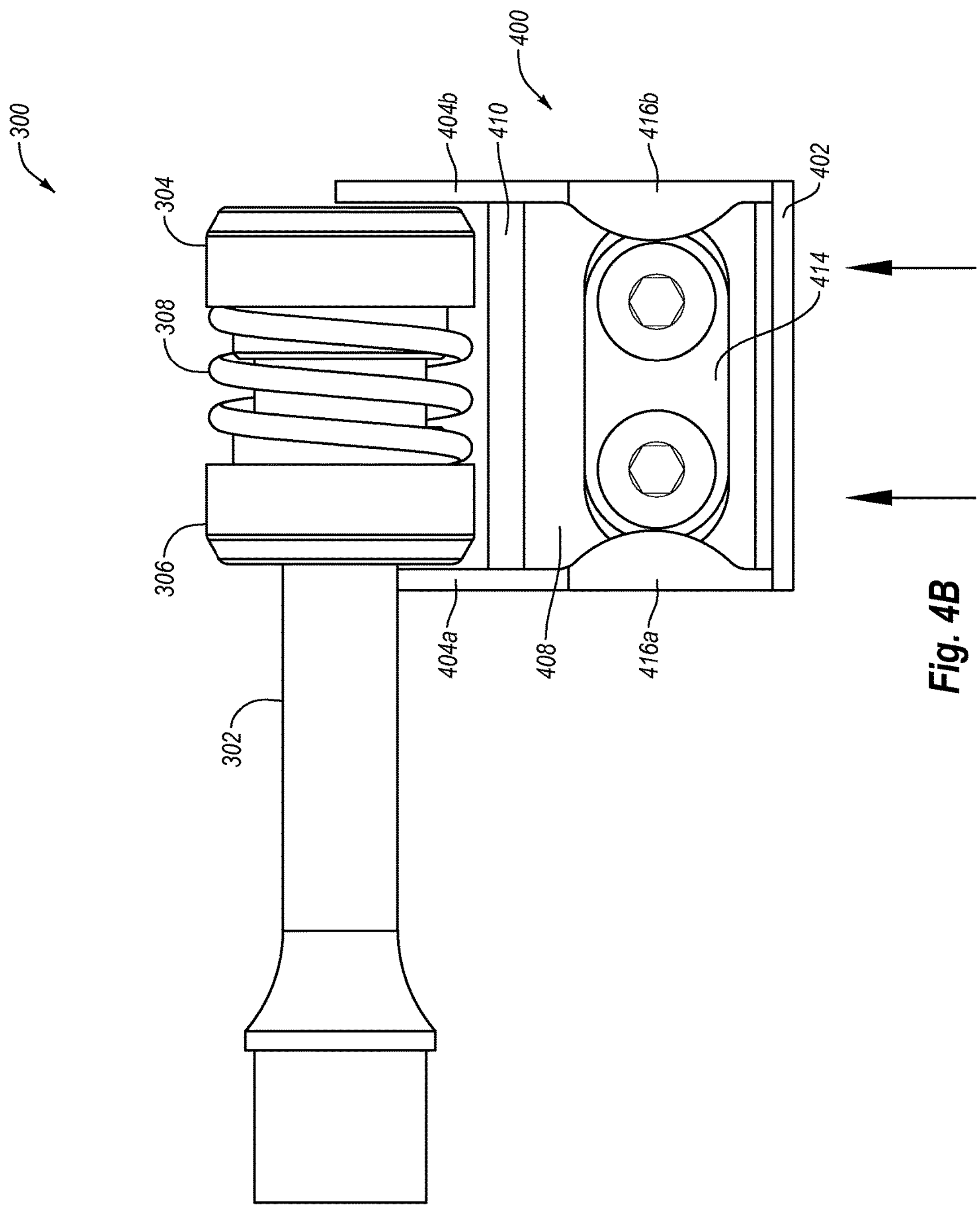
FIG. 4B through 4D illustrate an example method of engaging the cleat illustrated in FIG. 4 with the engagement assembly illustrated in FIG. 3.

FIGS. 4B through 4E illustrate one example implementation of how the cleat 400 engages the engagement assembly 300. In particular, FIG. 4B illustrates that a cyclist can place the engagement assembly 300 within the open back 406 of the cleat 400 such that the engagement assembly 300 is between the side walls 404*a* and 404*b*. As discussed above, the side walls 404*a* and 404*b* may be angled outward such that the engagement assembly 300 is easily guided between the side walls 404*a* and 404*b* as the cyclist moves the cleat in the direction of the force arrows illustrated in FIG. 4B.

When the engagement assembly 300 is initially positioned between the side walls 404*a* and 404*b*, the engagement assembly 300 is in a less compressed state (i.e., the spring 308 is biasing the inside grabber 306 away from the outside grabber 304 at a maximum distance). However, as a cyclist continues to move the cleat 400 with respect to the engagement assembly 300, as shown in FIG. 4C, both the outside grabber 304 and the inside grabber 306 come into contact with the protrusions 416*b* and 416*a*, respectively, which causes the engagement assembly to transition to a greater compressed state (i.e., the spring 308 compresses and the distances between the inside grabber 306 and the outside grabber 308 decreases).

Figure 4C:
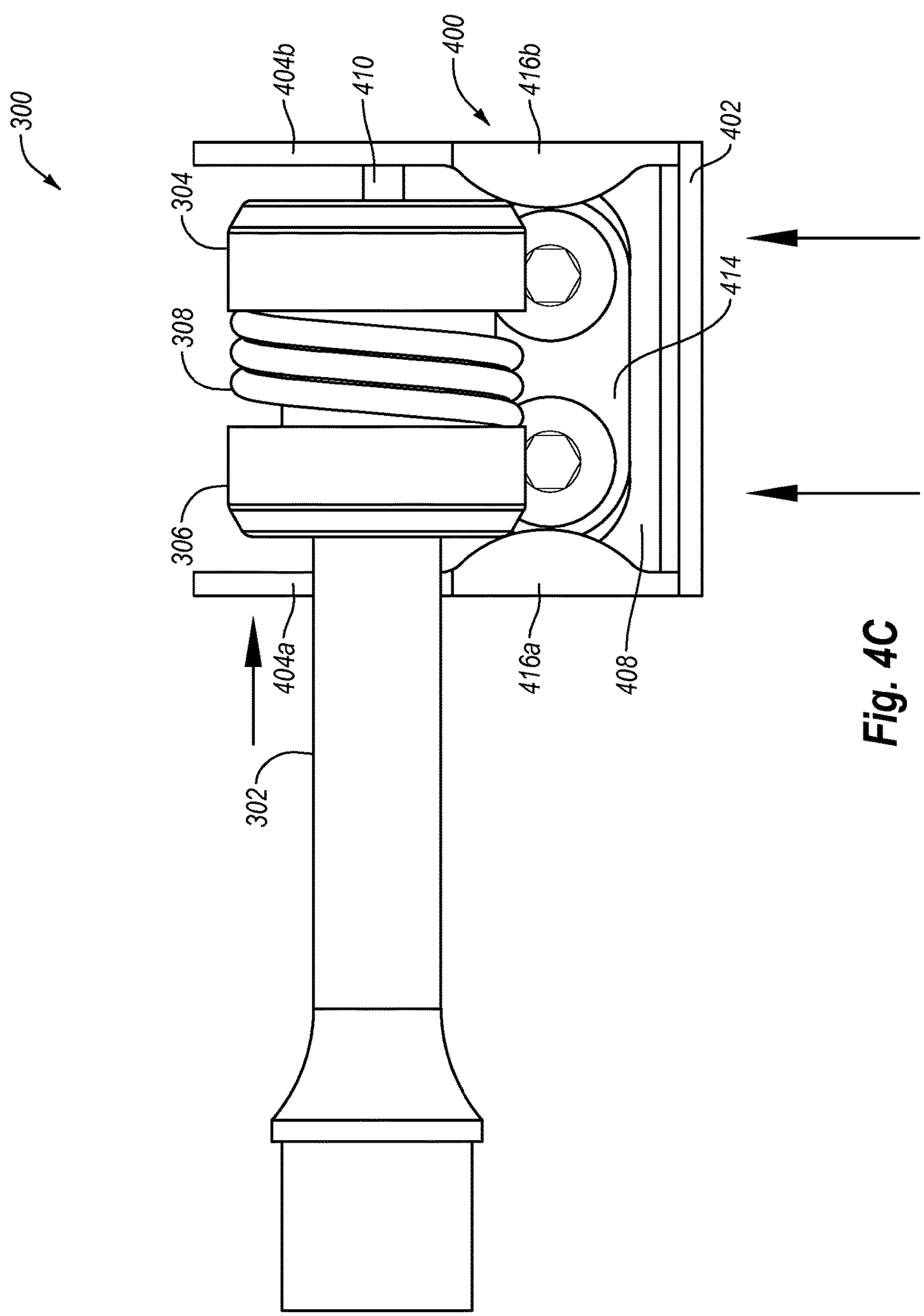

In particular, and as illustrated in FIG. 4C, the inside grabber 306 moves towards the outside grabber 304 (as indicated by the force arrow) thereby further compressing the spring 308. In one example implementation, as illustrated in FIG. 4C, the inside grabber 306 is the only piece of the engagement assembly the moves. In other words, the position of the outside grabber 304 is fixed with respect to the spindle 302. In alternative implementations, however, both the inside grabber 306 as well as the outside grabber 304 can move as the spring 308 is compressed. In yet a further implementation, the inside grabber 306 can be fixed, while it is the outside grabber 304 that moves when the spring 308 is compressed.

Depending on the cycling application, it can be advantageous to have the outside grabber 304 fixed and the inside grabber 306 move when the spring is compressed (i.e., the example shown in FIG. 4C). For instance, in mountain biking applications, it is possible that a rock or other piece of earth strikes the outside grabber 304 during use, thus causing the spring to compress unexpectedly if the outside grabber 304 is not fixed. However, if the outside grabber 304 is fixed, then the outside grabber 304 can strike the rock or other piece of earth and the spring 308 will not compress and the cleat will therefore remain secured to the engagement assembly 300. However, with alternative biking applications, it may be appropriate to have the outside grabber 304 be able to move.

Figure 4D:
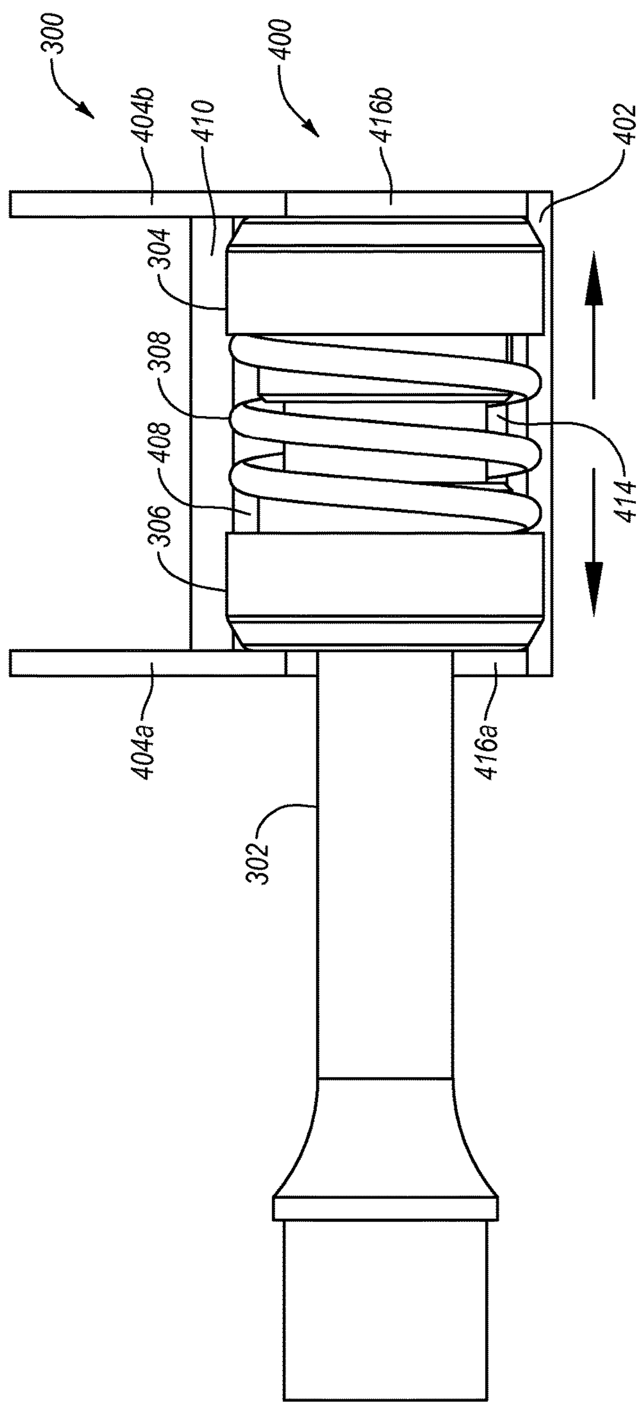
Figure 4E:
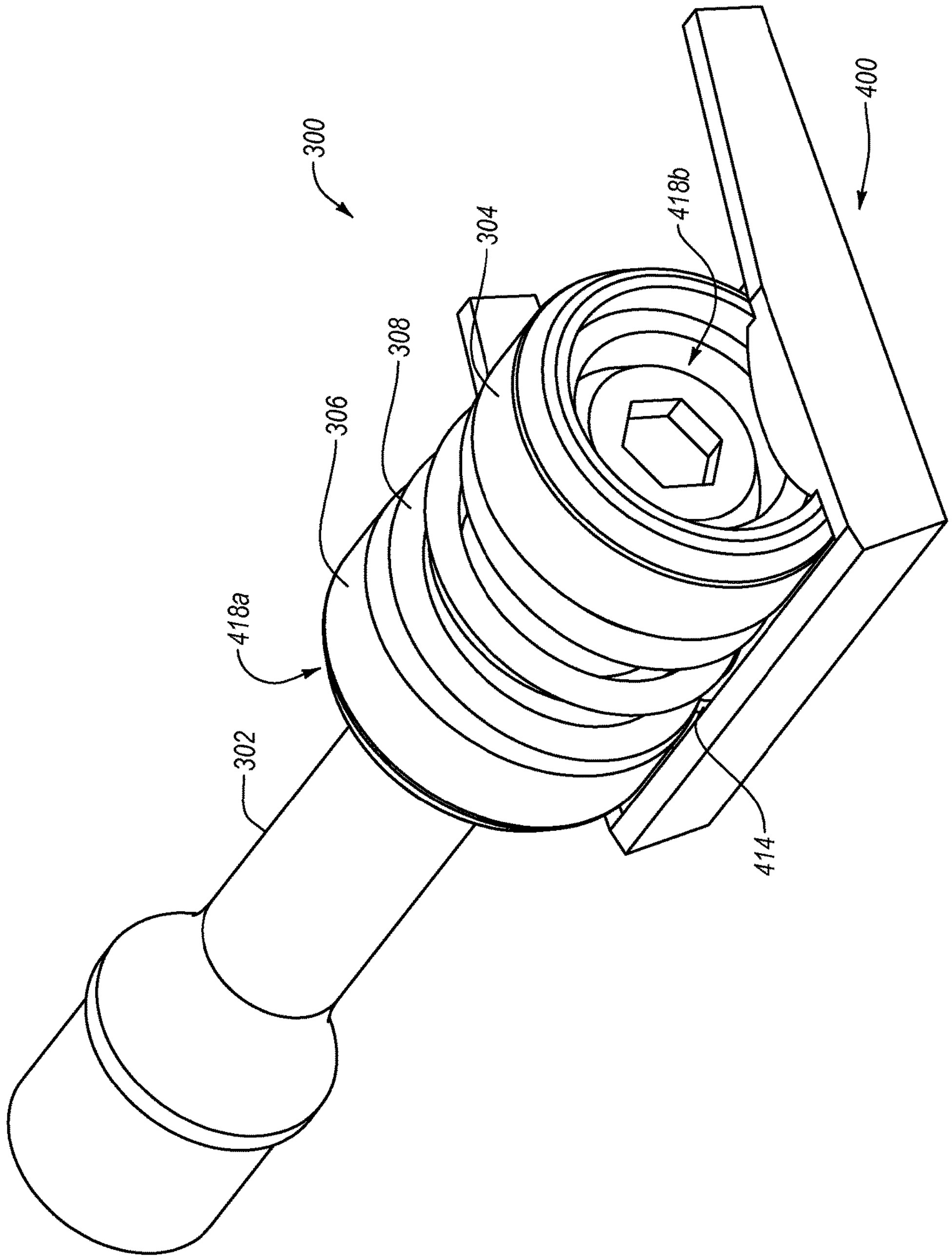
FIG. 4E illustrates an orthogonal view of the cleat engaged with the engagement assembly.

As illustrated in FIGS. 4C and 4D, the cyclist can continue to move the cleat 400 such that the protrusions 416*a* and 416*b* are ultimately pushed into a recess 418*a* and 418*b* located respectively in the outside grabber 304 and the inside grabber 306 (see FIG. 4E). Once the protrusions 416*a* and 416*b* are within the recesses 418*a* and 418*b*, the spring 308 again biases the inside grabber 306 away from the outside grabber 304 such that the outside grabber 304 and inside grabber 306 are positioned at a maximum distance from one another. Because the protrusions 416*a* and 416*b* are now positioned within the recesses 418*a* and 418*b*, the engagement assembly 300 is locked into the cleat 400.

FIG. 4E illustrates a perspective view of an example engagement assembly 300 engaged with an example cleat 400. In particular, it can be seen that the protrusions 416*a* and 416*b* can engage the engagement assembly 300 no matter the orientation of the engagement assembly 300 on the spindle 302. Moreover, once the engagement assembly 300 engages the cleat 400, the cleat 400 is securely coupled to the engagement assembly 300 until a cyclist wishes to disengage because the spring 308 presses both the inside grabber 306 and the outside grabber 304 such that the protrusions 416*a* and 416*b* are maintained within the recesses 418*a* and 418*b*.

When a cyclist wishes to disengage, the cyclist can simply rotate the cleat 400 with respect to the engagement assembly, thereby causing the spring 308 to compress. Upon compressing, the inside grabber 306 moves closer to the outside grabber 304 and the cyclist can simply pull the cleat 400 away such that the protrusions 416*a* and 416*b* disengage the recesses 418*a* and 418*b*. In other words, a cyclist need only twist his or her foot relative to the engagement assembly 300 and the cleat 400 will disengage. This motion of disengagement is also very useful in case of a crash. If a cyclist crashes and is thrown from his or her bicycle, then usually the cyclist's feet will rotate sufficiently with respect to the engagement assembly 300 such that the cleat 400 is released with respect to the engagement assembly 300. Thus, the pedal system 200 provides a secure connection during cycling, while at the same time providing an emergency release in the event of a crash.

Figure 5A:
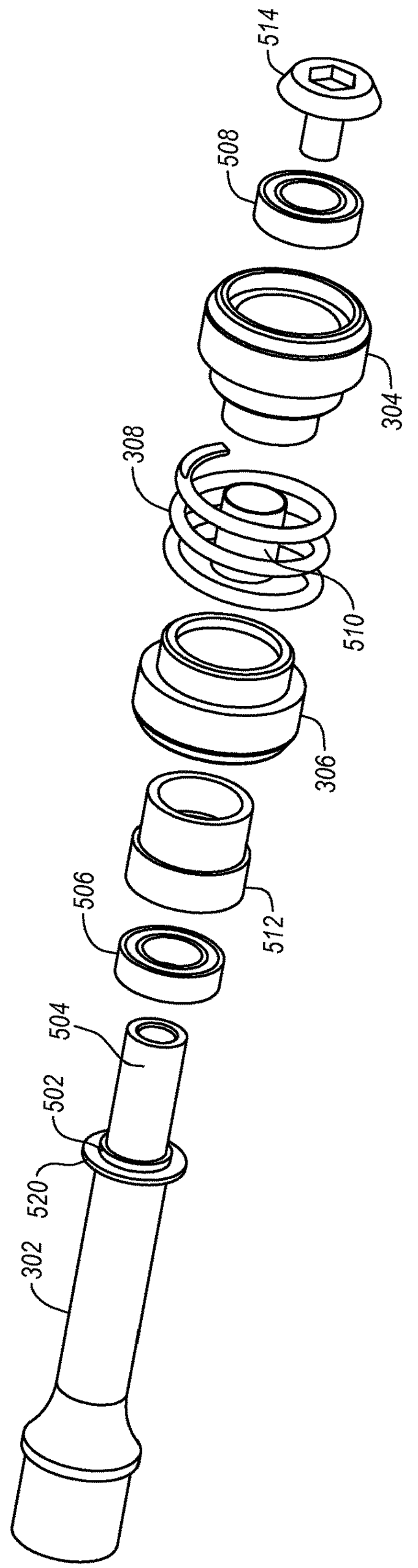
FIG. 5A illustrates an orthogonal exploded view of the engagement assembly of the pedal system.
Figure 5B:
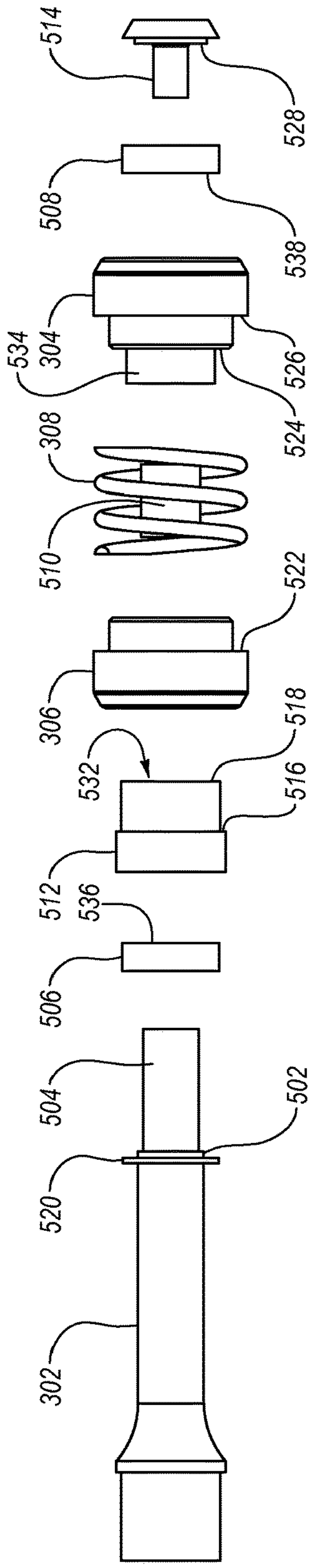
FIG. 5B illustrates an exploded plan view of the engagement assembly of the pedal system.

FIGS. 5A and 5B will be used to discuss the engagement assembly 300 in more detail. In particular, FIG. 5A illustrates a perspective exploded view of the engagement assembly 300. As an overview, the engagement assembly 300 can include a stop 502 that is fixed to the spindle 302. Extending away from the stop 502 can be a threaded post 504 on which the engagement assembly 300 is mounted. The engagement assembly 300 can further include a slider portion 512 configured to have the inside grabber slide axially thereon.

In one example implementation, the slider portion 512 and the outside grabber 304 screw together using a hex key in the center of the outside grabber 304 to create a solid hub. The inside grabber 306 and the spring 308 must first be assembled onto the slider portion 512 before the outside grabber 304 is screwed to the slider portion 512. A inside bearing 506 and an outside bearing 508 are inserted into the slider portion 512 and the outside grabber 304, respectively, with a spacer 510 inserted through the assembly such that the spacer 510 contacts and keeps the inside bearing 506 and outside bearing 508 at a predetermined distance from one another and within the slider portion 512 and the outside grabber 304, respectively. The entire engagement assembly 300 is then mounted between a stop 502 on a threaded post 504 and a bolt 514 that threads into the threaded post 504 on the spindle 302.

With the configurations illustrated and explained with respect to FIG. 5A, the entire engagement assembly 300 (i.e., the slider 512, spring 308, and the inside and outside grabbers 306 and 304) are free to spin or rotate freely on the bearings 506 and 508 without binding. In other words, as a cyclist pedals, the inside grabber 306 and the outside grabber 304 remain in a fixed position with respect to the cleat 400; however, the inside grabber 306 and the outside grabber 304 rotate with respect to the spindle 302. The inside bearing 506 and the outside bearing 508 allow the inside grabber 306 and the outside grabber 304 to freely rotate about the threaded post 504 with minimal friction.

In one example implementation, the inside bearing 506 and the outside bearing 508 can be sealed ball bearings. In an alternative implementations, the inside bearing 506 and the outside bearing 508 can be a solid type bearing such as TEFLON or other low frictional material. Almost any type of bearing may be used in order to allow the engagement assembly 300 to rotate about the spindle 302. Moreover, in some alternative implementations, there is no bearing and the engagement assembly 300 is simply made to rotate directly on the threaded post 504. In these types of implementations, a lubricant, such as grease, can be applied between the threaded post 504 and the engagement assembly 300.

In addition to various types of bearings, the material with which the slider portion 512 is made can vary from one implementation to the next. For example, in one implementation, the slider portion 512 is made from bronze. In another implementation, the slider portion 512 material can be another type of metal, an alloy, plastic, or even a composite material. In even further implementations, the slider portion 512 can be almost any material as long as the inside grabber 306 is allowed to easily slide over the slider portion 512 as the spring 308 is compressed. The inside grabber 306 and outside grabber 304 may also be made with similar materials as those described above.

As with the slider portion 512, the spacer 510 can be made from various materials. In one example, the spacer 510 material is made from titanium such that the spacer 510 adds minimal weight to the engagement assembly. However, the spacer 510 material can be almost any rigid material that creates a defined distance between the outside grabber 304 and the slider portion 512. For example, in alternative example, the spacer 510 material is a rigid plastic material.

In addition to the variations in the components described above, the spring 308 can also vary from one implementation to the next. For example, FIG. 5A illustrates that the spring 308 is a compression spring. In alternative implementations, the spring 308 can be a wave spring or a bushing-type spring. Moreover, the spring 308 can be covered with a dust boot (not shown), or other similar covering, such that dust and dirt do not enter the engagement assembly during use.

FIG. 5B will further be used to discuss the interaction between each of the example components of the engagement assembly 300. As FIG. 5B illustrates, the spindle 302 can include a cap 520. The cap 520 can act as a dust protector that prevents dust or dirt from entering the other components of the engagement assembly 300.

Coupled to the cap 520 is a stop 502, which can be a raised surface from the cap 520, as illustrated in FIGS. 5A and 5B. In particular, the stop 502 can be sized and positioned such that the stop 502 interfaces with the inner race 536 of the inside bearing 506. Thus, the engagement assembly 300 is secured on the inside side of the spindle by the stop 502 interfacing with the bearing 506, and the bearing interfacing with a surface within the slider portion 512.

The slider portion 512 can include an inside grabber interface 516, which is configured to interface with a surface within the inside grabber 306. For example, the slider portion 512 can be inserted into the inside grabber 306 until the inside grabber interface 516 contacts a matching surface within the inside grabber 306. The inside grabber interface 516 is located on the slider portion 512 such that the inside grabber 306 can slide on the slider portion against the spring 308 bias, but the spring 308 bias cannot push the insider grabber 306 past the slider portion 512 in the direction of the spindle 302.

Additionally, the slider portion 512 can include an outside grabber port 532, which is configured to accept a slider insert 534 that is located on the outside grabber 304, as illustrated in FIG. 5B. In one example implementation, the outside grabber port 532 is a threaded port, and the slider insert 534 is a threaded post such that the outside grabber 304 can be threaded into the slider portion 512 to create a solid hub. In one implementation, the outside grabber 304 includes a hex key within the recess 418*b* (see FIG. 4E) such that the outside grabber 304 can be securely tightened within the slider portion 512.

In an alternative example implementation, the slider portion 512 can include a threaded post and the outside grabber 304 can include a port such that at least a portion of the slider portion 512 can be inserted within the port located on the outside grabber 304. In one implementation, the configuration substantially opposite of what is illustrated in FIG. 5B, e.g., the threaded port 532 can be located on outside grabber 304 instead of the slider portion 512, and the threaded post can be located on the slider portion 512 instead of the outside grabber 304.

Continuing with the characteristics of the slider portion 512, the slider portion 512 also can include an outside grabber seat 518 that interfaces with a slider seat 524 located on the outside grabber 304 such that the outside grabber seat 518 and the slider seat 524 are in contact when the slider insert 534 is properly inserted into the outside grabber port 532. The outside grabber seat 518 and the slider seat 524 can be positioned such that a predetermined distance or dimension is achieved between the inside grabber 306 and the outside grabber 304, such that a corresponding dimension can be determined to make the cleat 400.

The outside grabber 304 and inside grabber 306 can also include spring seats 526 and 522, respectively. The spring seats 526 and 522 can be a ridge, shoulder, or other surface designed to allow the spring 308 to securely seat against the outside grabber 304 and the inside grabber 306. Depending on the type of spring used, the spring seats 526 and 522 can vary from one implementation to the next.

In order to properly position the bearings 506 and 508, the bearings 506 and 508 can include a spacer interface 536 and 538 that are configured to interface with the spacer 510. For example, in one implementation the bearings 506 and 508 can be ball bearings, and the spacer interface 536 and 538 can be a portion on the inner races of the bearings 506 and 508.

Finally, the bolt 514 can include a securing surface 528 that interfaces with the inner races, for example, of the outside bearing 508 such that when the bolt 514 is coupled to the threaded post 504, the entire engagement assembly 300 is held between the stop 502 and the securing surface 528 located on the bolt 514. In alternative implementations, the bolt can simply be a clip or other device that can include a securing surface 528 that holds the engagement assembly 300 to the spindle 302.

Figure 6:
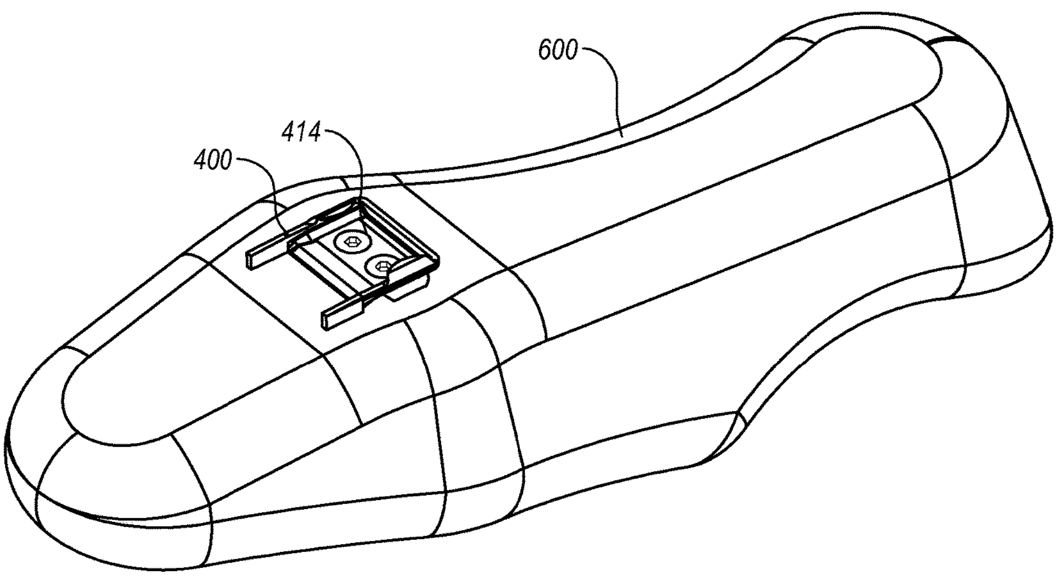
FIG. 6 illustrates an example cyclist shoe with the cleat mounted thereto.

Notwithstanding the many configurations and features of the engagement assembly 300 illustrated in FIGS. 5A and 5B, the engagement assembly 300 generally is configured to interface with the cleat 400 that is coupled to a shoe. For example, FIG. 6 illustrates an example implementation of the cleat 400 coupled to a shoe 600 using a bolt plate 414. As illustrated, the cleat 400 can generally be positioned on the ball portion of the shoe such that the engagement assembly 300 of the pedal system 200 is positioned under the portion of the cyclist's foot that directly presses on the pedal system 200. In alternative implementations, however, and according to a cyclist's preference, the cleat 400 can be positioned at other locations on the shoe 600.

Moreover, FIG. 6 illustrates that the shoe 600 is a typical cycling shoe style. The cleat 400, however, can be coupled to almost any type of shoe, sandal, boot, or any other type of foot wear that a cyclist may use. In one implementation, the cleat 400 can bout coupled to a regular athletic shoe with the cleat 400 positioned within a slot (not shown) such that the cyclist can walk in a ordinary manner without walking on the cleat 400, yet the slot allows the engagement assembly 300 to engage the cleat 400.

FIG. 6 also shows a variation on the cleat 400 compared to the cleat 400 illustrated in FIGS. 4A through 4E. However, FIG. 6 illustrates that the cleat 400 still includes the side walls, front wall, and protrusions necessary to engage the engagement assembly 300.

The present invention thus can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A pedal system comprising:

a cleat attached to a bottom portion of a shoe, the cleat comprising:
- a frame with a front wall, a first side wall, a second side wall, and a base;
- the first side wall includes a first portion and a second portion;
- the second side wall includes a first portion and a second portion;
- a first protrusion extending from the first portion of the first side wall toward the second side wall; and
- a second protrusion extending from the first portion of the second side wall toward the first side wall; and
- the second portion of the first side wall extends from the base to a distal end of the first side wall away from the front wall; and
- the second portion of the second side wall extends from the base to a distal end of the second side wall away from the front wall;

the second portion of the first side wall and the second portion of the second side wall define an open back therebetween;

an engagement assembly, comprising:

a spindle configured to attach at a first end to a crank arm, the spindle comprising a threaded second end;

a first grabber coupled to the threaded second end of the spindle, the first grabber defining a first recess which circumscribes an axis of the spindle; and a second grabber movably positioned between the first grabber and a stop located on the spindle, the second grabber defining a second recess which circumscribes the axis of the spindle, the second grabber biased along the axis of the spindle away from the first grabber and toward the stop.

2. The pedal system as recited in claim 1, wherein the front wall, the first side wall, and the second side wall of the cleat form a u-shaped configuration.

3. The pedal system as recited in claim 1, wherein the first protrusion and the second protrusion have a substantially semi-circular configuration.

4. The pedal system as recited in claim 1, wherein the cleat is made from a light weight material that includes one or more of the following materials: titanium, carbon fiber, or a metal alloy.

5. The pedal system as recited in claim 1, wherein the second grabber is biased toward the stop on the spindle by a spring positioned between the first grabber and the second grabber.

6. The pedal system as recited in claim 5, wherein the engagement assembly further comprises a slider portion that at least partially extends through the second grabber such that the second grabber can slide on the slider portion.

7. The pedal system as recited in claim 6, wherein the slider portion couples to the first grabber to form a solid hub.

8. The pedal system as recited in claim 7, wherein the engagement assembly further comprises:

a spacer;

an inside bearing that interfaces with the stop located on the spindle; and an outside bearing, wherein the inside bearing and outside bearing are separated by the spacer such that the inside bearing is within the slider portion and the outside bearing is within the first grabber causing the engagement assembly to rotate about the spindle.

9. The pedal system as recited in claim 8, wherein the engagement assembly is assembled on the threaded second end of the spindle.

10. The pedal system as recited in claim 9, further comprising a bolt that secures the engagement assembly on the threaded second end of the spindle between the stop and the bolt, wherein the bolt has a securing surface that interfaces with the outside bearing.

11. The pedal system as recited in claim 1, wherein:

the first grabber defines the first recess with a circular geometry aligned perpendicular to the axis of the spindle; and the second grabber defines the second recess with a circular geometry aligned perpendicular to the axis of the spindle.

12. The pedal system as recited in claim 1, wherein:

the base is disposed to contact a bottom sole of the shoe;

the front wall, the first side wall, and the second side wall are disposed to extend downward from the bottom sole of the shoe; and the first and second protrusions extend parallel to the base.

13. An engagement assembly for use with a pedal system, the engagement assembly configured to engage a cleat of the pedal system, the engagement assembly comprising:

a first grabber coupled to a threaded end of a spindle, the first grabber immovable along a length of the spindle and comprising a continuous first engagement recess to engage the cleat at every rotational angle of the first grabber;

a second grabber movably positioned between the first grabber and a stop located between the threaded end of the spindle and an end of the spindle configured to attach to a crank arm, the second grabber biased along an axis of the spindle away from the first grabber and toward the stop, the second grabber comprising a continuous second engagement recess to engage the cleat at every rotational angle of the second grabber, wherein the first engagement recess is exposed beyond the threaded end of the spindle in a direction along the length of the spindle and away from the crank arm, wherein the cleat comprises:

a frame with a front wall, a first side wall having a first portion and a second portion, a second side wall having a first portion and a second portion, and a base;

a first protrusion extending from the first portion of the first side wall toward the second side wall and a second protrusion extending from the first portion of the second side wall toward the first side wall; and the second portion of the first side wall extends from the base to a distal end of the first side wall away from the front wall; and the second portion of the second side wall extends from the base to a distal end of the second side wall away from the front wall;

the second portion of the first side wall and the second portion of the second side wall define an open back therebetween.

14. The engagement assembly recited in claim 13, further comprising a slider portion that is operatively associated with the second grabber such that the second grabber can slide upon the slider portion.

15. The engagement assembly recited in claim 14, further comprising a spring positioned between the second grabber and the first grabber, wherein the spring biases the second grabber toward the stop on the spindle and away from the first grabber.

16. The engagement assembly recited in claim 15, further comprising an inside bearing that is located within the slider portion such that the slider portion, and thus the second grabber, rotate about the spindle.

17. The engagement assembly recited in claim 16, further comprising an outside bearing that is located within the first grabber such that the first grabber can rotate about the spindle.

18. A bicycle pedal to engage a cleat on a cycling shoe, the pedal comprising:

a spindle with a first end to couple to a crank arm;

a first grabber and a second grabber disposed toward a second end of the spindle, wherein the second grabber is movable along an axis of the spindle in response to contact and force from the cleat to overcome a bias force on the second grabber, and wherein each of the first and second grabbers defines a respective circular recess aligned perpendicular to the axis of the spindle, each of the respective circular recesses engages a respective one of a first protrusion and a second protrusion from the cleat, wherein the respective circular recess of the second grabber is disposed toward the first end and wherein the respective circular recess of the first grabber is disposed toward the second end, and wherein the respective circular recess of the first grabber is exposed beyond the second end of the spindle in a direction along a length of the spindle and away from the crank arm, wherein the cleat comprises:

a frame with a front wall, a first side wall having a first portion and a second portion, a second side wall having a first portion and a second portion, and a base;

the first protrusion extends from the first portion of the first side wall toward the second side wall and the second protrusion extends from the first portion of the second side wall toward the first side wall; and the second portion of the first side wall extends from the base to a distal end of the first side wall away from the front wall; and the second portion of the second side wall extends from the base to a distal end of the second side wall away from the front wall;

the second portion of the first side wall and the second portion of the second side wall define an open back therebetween.

19. The pedal as recited in claim 18, wherein each of the respective circular recesses respectively circumscribes the axis of the spindle.

20. The pedal as recited in claim 18, further comprising a spring disposed around the spindle and between the first and second grabbers, wherein the spring is configured to provide the bias force on the first grabber in a direction parallel to the axis of the spindle and away from the second grabber.

* * * * *